3,684,676
ELECTRODEPOSITION OF WATER-BASED RESINS WITH STABILIZED METAL CHROMATE PIGMENTS

Morris Levine, Cleveland Heights, Ralph M. Brane, Bay Village, and Roland W. Hight, Cleveland, Ohio, assignors to PPG Industries, Inc., Pittsburgh, Pa.
No Drawing. Original application Apr. 30, 1968, Ser. No. 725,496. Divided and this application Oct. 22, 1970, Ser. No. 83,253
Int. Cl. B01k 5/02; B32b 15/08; C23b 13/00
U.S. Cl. 204—181
5 Claims

ABSTRACT OF THE DISCLOSURE

Aqueous coating compositions of polycarboxylic acids solubilized with water-soluble alkaline materials and pigmented with metal chromate pigments are stabilized against gelation and seeding by the addition of lead pigment compounds. Metals coated with the compositions are highly resistant to corrosion and the compositions can be coated onto substrates using various methods including dip coating and electrodeposition.

CROSS-REFERENCES TO RELATED APPLICATIONS

This application is a divisional application of U.S. Ser. No. 725,496, filed Apr. 30, 1968 now abandoned.

The coating of metal substrates involves the dual problem of obtaining an attractive and corrosion resistant coating. The use of pigmented solvent-based coating compositions involves many problems such as high expense and difficulty in handling the solvent driven off by baking. To alleviate this problem, pigmented water-soluble coating compositions are extensively used.

It has been found that the best corrosion resisting coatings are those containing metal chromate pigments. In the past, it has been difficult to obtain metal chromate pigmented water-soluble coatings due to ionizing reactions of the metal chromate pigments with the acid components of the water-soluble resin composition. Conventional metal chromate pigments used to produce corrosion resistant coatings react with the free acid ions in the water-soluble vehicles to form soaps which gel the coating composition. In other words, the viscosity of the coating composition is increased to a point where the composition cannot be mixed and it is impossible to maintain a uniform homogeneous coating composition. In many cases the soaps formed congeal into lumps and settle out in the coating composition. This is commonly referred to as "seeding." Thus, the problem of achieving a uniform homogeneous water-soluble coating composition which is capable of containing corrosion resistant pigments without gelling or seeding has been unsolved until this time.

It has now been discovered that the use of lead pigment compounds which are, to a small degree, corrosion resistant in the water-soluble coating compositions will allow other corrosion resistant pigments to be added to the water-soluble compositions without gelling or seeding.

The precise reaction which occurs between the metal chromate pigment and/or the lead pigment compound with the free acid ions of the coating compositions is not known. It is believed that the lead ions react with the free acid ions to form a lead soap which does not gel the compositions and will not exhibit seeding. The metal chromate pigments may then be added to the coating compositions without reacting with the free acid ions.

In a preferred method, the polycarboxylic acid resin is solubilized by a water-soluble alkaline material and the lead pigment compound is added to the composition prior to the addition of the corrosion resistant pigments so that the free acid ions are tied up. When this is done, no appreciable viscosity rise occurs on the addition of the more corrosion resistant pigments.

Alternatively the lead pigment compound may be added to the composition at substantially the same time as the corrosion resistant pigments or at any time after the addition of the corrosion resistant pigments so long as there are unreacted acid ions present. Using the latter practice, the viscosity of the composition can be stabilized by the lead pigment compound at any desired viscosity.

The lead pigment compound may be mixed in the composition at room temperature. It is preferred to agitate the mixture to completely react the free acid ions with the lead ions. In the preferred embodiments, the lead pigment is added to the composition from up to 24 hours prior to the addition of the corrosion resistant pigments.

The preferred polycarboxylic acid resins which may be employed in the process invention comprise a reaction product or adduct of the drying oil or semi-drying oil fatty acid ester with a dicarboxylic acid or anhydride. By drying oil or semi-drying oil fatty acid esters are meant esters of fatty acids which are or can be derived from drying oils or semi-drying oils, or from such sources as tall oil. Such fatty acids are characterized by containing at least a portion of polyunsaturated fatty acids. Preferably, the drying oil or semi-drying oil per se is employed. Generally, drying oils are those oils which have an iodine value of above about 130, and the semi-drying oils are those which have an iodine value of about 90 to 130, as determined by method ASTM D1467–57T. Examples of such esters include linseed oil, soya oil, safflower oil, perila oil, tung oil, oiticica oil, poppyseed oil, sunflower oil, tall oil esters, walnut oil, dehydrated castor oil, herring oil, menhadan oil, sardine oil, and the like.

Also included among such esters are those in which the esters themselves are modified with other acids, including saturated, unsaturated or aromatic acids such as butyric acid, stearic acid, linoleic acid, phthalic acid, isophthalic acid, terephthalic acid or benzoic acid, or any anhydride of such an acid. One inexpensive acid material which has been found to produce good results in many instances is rosin, which is composed of chiefly abietic acid and other resin acids. The acid modified esters are made by transesterification of the ester, as by forming a di- or monoglyceride by alcoholysis, followed by esterification with the acid; they may also be obtained by reacting oil acids with a polyol and reacting the acid with the partial ester. In addition to glycerol, alcoholysis can be carried out using other polyols such as trimethylolpropane, pentaerythritol, sorbitol, and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols, are also useful.

Also included within the terms "drying oil fatty acid esters" and "semi-drying oil fatty acid esters" as set forth herein are alkyd resins prepared utilizing semi-drying or drying oils; esters of epoxides with such fatty acids, including esters of diglycidyl ethers of polyhydric compounds as well as other mono-, di- and polyepoxides; semi-drying or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha,beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances it requires more stringent conditions than the unsaturated dicarboxylic acid anhydrides or acids which form such anhydrides. Mixtures of any of the above acids or anhydrides may also be utilized. Generally speaking, the anhydride or acid employed contains from 4 to 12 carbon atoms, although longer chain compounds can be used if so desired.

While the exact nature of the reaction product of the acid or anhydride with the fatty acid ester is not known with certainty, it is believed that the reaction takes place by addition of the unsaturated linkage of the acid or anhydride to the carbon chain of the oil. In the case of non-conjugated double bonds, such as are present in linseed oil, the reaction may take place with the methylene group adjacent the non-conjugated double bond. In the case of oils having conjugated double bonds, such as tung oil, the reaction is probably of the Diels-Alder type.

The reaction between the acid or acid anhydride and the drying oil or semi-drying oil fatty acid ester takes place readily without the use of a catalyst and at temperatures in the range of about 100° C. to about 300° C. or higher, with the reaction generally being carried out between about 200° C. and about 250° C.

While the reaction products can be comprised solely of adducts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion and which may have other similar desirable characteristics. For this purpose, any ethylenically unsaturated monomer can be employed. Examples of such monomers include monoolefinic and diolefinic hydrocarbons such as styrene, alpha-methyl styrene, styrene-butadiene, alpha-butyl styrene, vinyl toluene, butadiene-1,3-isoprene, and the like; halogenated monoolefinic and diolefinic hydrocarbons, such as alpha-chlorostyrene, alpha-bromostyrene, chlorobutadiene and similar compounds; esters of organic and inorganic acids, such as vinyl acetate, vinyl propionate, vinyl 2-chlorobenzoate, methyl acrylate, ethyl methacrylate, butyl methacrylate, heptyl acrylate, decyl methacrylate, methyl crotonate, isopropenyl acetate, vinyl alpha-bromopropionate, vinyl alpha-chlorovalerate, allyl chloride, allyl cyanide, allyl bromide, allyl acetate, dimethyl itaconate, dibutyl itaconate, ethyl alpha-chloroacrylate, isopropyl alpha-bromoacrylate, decyl alpha-chloroacrylate, dimethyl maleate, diethyl maleate, dimethyl fumarate, diethyl fumarate, and diethyl glutaconate; organic nitriles, such as acrylonitrile, methacrylonitrile, and ethacrylonitrile; and the like.

As is apparent from the above discussion and the examples set forth, which, of course, do not include all of the ethylenically unsaturated monomers which may be employed, any such monomer can be utilized. The preferred class of monomers can be described by the formula:

(I)
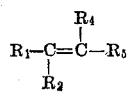

where $R_1$ and $R_2$ are hydrogen or alkyl, $R_4$ is hydrogen, alkyl or carboxyalkyl and $R_5$ is cyano, aryl, alkyl, alkenyl, aralkyl, alkaryl, alkoxycarbonyl or aryloxycarbonyl. The preferred compounds are styrene, substituted styrenes, such as styrene-butadiene, alkyl acrylates, alkyl methacrylates, diolefins and acrylonitrile.

The reaction of the fatty acid ester, the acid or anhydride and any additional monomer or monomers can be carried out concurrently, that is, with each of the components of the reaction product being mixed together and heated to reaction temperature. However, because the monomer and the acid or anhydride are often quite reactive with each other, the oil or other fatty acid ester is preferably first reacted with the acid or acid anhydride, and then this product is subsequently reacted with any ethylenically unsaturated monomer or monomers employed. For example, a reaction product of linseed oil, maleic anhydride and styrene is made by first reacting maleic anhydride with linseed oil and then reacting the malenized oil with styrene. When the process is carried out in this manner, the reaction of the additional monomer with the initial reaction product is usually carried out at somewhat lower temperatures, usually between about 25° C. and 200° C.

The proportions of each of the components going to make up the reaction product are ordinarily not critical. Generally speaking, between about 10 percent and about 45 percent by weight of the unsaturated acid or acid anhydride is reacted with from about 55 percent to about 90 percent by weight of fatty acid ester. In the presently preferred products, usually 15 percent to 30 percent of anhydride and 70 percent to 85 percent of oil ester are employed. If an ethylenically unsaturated monomer is incorporated in the reaction product, it is typically used in amounts between about 5 percent and about 35 percent by weight, based upon the total weight of acid or anhydride and ester, with between 10 percent and 25 percent being used in those products preferred at present. Thus, in most instances the total composition of the reaction product may comprise from about 35 percent to about 90 percent by weight of the fatty acid ester and from about 10 percent to about 65 percent of the acid or anhydride and other monomer combined, with between about 6 percent and about 45 percent of the acid or anhydride always present. Neutralization or solubilization of these products is accomplished by reaction of all or part of the dicarboxylic anhydride groups with a base. Usually up to about half of such groups are neutralized in unesterified adducts; the partially esterified products are often neutralized to a greater extent, based on unesterified acid groups remaining.

It is preferred in certain instances that the neutralization reaction be carried out in such a manner that amido groups are attached to part of the carbonyl carbon atoms derived from the dicarboxylic acid or anhydride. By amido groups are meant trivalent nitrogen atoms attached with one valence to the carbonyl carbon atom with the other two valences being linked to hydrogen or carbon atoms in the same or different organic radicals. Amido groups are formed, for example, when the reaction with the neutralizing base is carried out with a water solution of ammonia, a primary amine or a secondary amine, or when the product is reacted with such an amine in the absence of water.

Another type of water-soluble composition which gives desirable results are the coating compositions comprising at least partially neutralized interpolymers of hydroxyalkyl esters of unsaturated carboxylic acids, unsaturated carboxylic acids and at least one other ethylenically unsaturated monomer. These are employed in the composition along with an amine-aldehyde condensation product or a polyepoxide, or both, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids, such as ethacrylic acid, crotonic acid, maleic acid, or other acids of up to about 6 carbon atoms can also be employed. The hydroxyalkyl ester is usually hydroxyethyl or hydroxypropyl acrylate or methacrylate, but also desirable are the various hydroxyalkyl esters of the above acids having, for example, up to about 5 carbon atoms in the hydroxyalkyl radical. Mono- or diesters of the dicarboxylic acids mentioned are included. Ordinarily, the acid and ester each comprise between about 1 percent and about 20 percent by weight of the interpolymer, with the remainder being made up of one or more other copolymerizable ethylenically unsaturated monomers. The most often used are the alkyl acrylates, such as ethyl acrylate; the alkyl methacrylates, such as methyl methacrylate; and the vinyl aromatic hydrocarbons, such as styrene; but others can be utilized.

The above interpolymer is at least partially neutralized by reaction with a base as described above; at least about 10 percent, and preferably 50 percent or more of the acidic groups are neutralized, and this can be carried out either before or after the incorporation of the interpolymer in the coating composition. The bases above can be used, with ammonia and amines being preferred; except when a polyepoxide is present, in which case there is preferably employed a hydroxide, such as sodium hydroxide, or if an amine, a tertiary amine.

The amine-aldehyde condensation products included in these compositions are, for example, condensation products of melamine, benzoguanamine, or urea with formaldehyde, although other amino-containing amines and amides, including triazines, diazines, triazoles, guanadines, guanamines and alkyl and aryl-substituted derivatives of such compounds can be employed, as can other aldehydes, such as acetaldehyde. The alkylol groups of the products can be etherified by reaction with an alcohol, and the products utilized can be water-soluble or organic solvent-soluble.

The compositions can also include a polyepoxide, which can be any epoxide compound or mixture with an epoxy functionality of greater than 1.0. Numerous such polyepoxides are known and are described in patents such as U.S. Pats. Nos. 2,467,171; 2,615,007; 2,716,123; 2,786,067; 3,030,336; 3,053,855; and 3,075,999. Included are polyglycidyl ethers of polyphenols, such as bisphenol A, or of aliphatic polyhydric alcohols, such as 1,4-butanediol; polyglycidyl esters of polycarboxylic acids, such as diglycidyl adipate; and polyepoxides from the epoxidation of unsaturated alicyclic compounds, such as 3,4-epoxy - 6 - methylcyclohexylmethyl-3,4-epoxy-6-methyl-cyclohexanecarboxylate.

Still another composition of desirable properties comprises an alkyd-amine vehicle, that is, a vehicle containing an alkyd resin and an amine-aldehyde resin. A number of these are known in the art and may be employed. Preferred are water dispersible alkyds such as those in which a conventional alkyd (such as a glyceryl phthalate resin), which may be modified with drying oil fatty acids, is made with a high acid number (e.g., 50 to 70) and solubilized with ammonia or an amine, or those in which a surface active agent, such as a polyalkylene glycol (e.g., "Carbowax"), is incorporated. High acid number alkyds are also made by employing a tricarboxylic acid, such as trimellitic acid or anhydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis(methoxymethyl) melamine.

The alkyd-amine compositions are dispersed in water and they ordinarily contain from about 10 percent to about 50 percent by weight of amine resin based on the total resinous components.

Examples of compositions of this class are described in U.S. Pats. Nos. 2,852,475; 2,852,476; and 2,853,459.

The neutralization and solubilization of the above vehicles is accomplished by the use of a base. Inorganic bases such as metal hydroxides or, more desirably, ammonia can be used for this purpose, as can organic bases, particularly amines. Among the preferred class of neutralizing bases are ammonia and any basic amine. Examples of such amine are primary and secondary amines, including alkyl amines, such as methylamine, ethylamine, propylamine, butylamine, amylamine, dimethylamine, diethylamine, dipropylamine, dibutylamine, and N-methylbutylamine; cycloalkyl amines, such as cyclohexylamine; unsaturated amines, such as allylamine, 1,2-dimethylpentenylamine and pyrrole; aryl amines, such as aniline; aralkyl amines such as benzylamine and phenethylamine; alkaryl amines, such as m-toluidine cyclic amines, such as morpholine, pyrrolidine and piperidine; diamines, such as hydrazine, methylhydrazine, 2,3-toluenediamine, ethylenediamine, 1,2-naphthalenediamine and piperazine; and substituted amines, such as histamine, hydroxylamine, ethanolamine, and diethanolamine; as well as tertiary amines such as trimethylamine, triethylamine, dimethylethanolamine, N-methyl morpholine, triethanolamine, and the like.

The solubilized polycarboxylic acid resins are used as the vehicle for the corrosion resistant metal chromate pigment. Examples of these pigments having the desired corrosion resistant properties are zinc chormate, strontium chromate, and calcium chromate. The use of these metal chromate pigments for corrosion resistant paints has long been a problem due to the gelling and seeding of the water-soluble resins when mixed with the metal chromate pigment. For example, when amounts of zinc chromate pigment greater than about 0.25 percent based on water-soluble resin solids have been used in the resin, gelling and seeding have been observed.

Using the lead pigments of this invention, as much zinc chromate or calcium chromate as is desired may be used in the resin without gelling or seeding, thus giving excellent corrosion resistant properties to the coating. Strontium chromate, which has less corrosion resistant properties than zinc chromate, must be used in greater quantities in order to attain the desired degree of corrosion resistance. Without the use of lead pigments, only about 10 percent strontium chromate based on water-soluble resin solids may be used in the water-soluble resin before the gelling and seeding problem appears. When the lead pigment is used however, the amount of strontium chromate can be raised to 75 percent without causing gelling or seeding problems.

Any lead pigment compound which supplies lead ions to the compositions may be used in this invention. Examples of these lead pigments are litharge (lead oxide), lead silicate, lead silico-chromate, red lead, lead chromate, and the like. The preferred lead pigment is litharage as this compound yields lead ion readily to the water-soluble composition.

Any amount of lead pigment may be used depending on the amount of metal chromate pigment used. If it is necessary to use a large amount of metal chromate pigment to attain the proper corrosion resistance, more lead pigments will be needed to stabilize the composition. In the preferred embodiment where litharge is used to stabilize zinc chromate, strontium chromate, or calcium chromate, the litharge may consitute from about 1 percent by weight of the resin to about 35 percent by weight of the resin.

The coating composition described can be applied to substrates in various ways, the most desirable being electro-depositing and dip coating.

If the coating composition is to be used in electrodeposition, it is preferred to use from about 3 percent to about 20 percent bath solids. If the coating composition is to be used as a dip primer however, a higher solids content may be used such as about 30 to 50 percent.

Usually the pigment is ground in a portion of the vehicle to make a paste and this is blended with the vehicle to produce the coating composition. As noted above, it is preferable to add the lead pigment prior to the addition of the metal chromate pigments. Other materials may also be included in the coating composition. Additives such as antioxidants, wetting agents, driers, antifoaming agents, bactericides, suspending agents, and the like, may also be included.

It has been found that in most instances desirable coatings are obtained using pigmented compositions containing ratios of pigments to vehicle of about 1.5 to 1 and preferably not higher than about 4 to 1. If the composition is used in electrodeposition, the ratio of pigment to vehicle is normally not higher than about 0.5 to 1. Excessively high pigment to vehicle ratios may result in poor flow characteristics.

In formulating water-dispersed compositions, ordinary tap water may be employed. However, such water may contain a relatively high level of cations which, while not ordinarily rendering the process inoperative, may result in variations in the properties of the bath when used for electrodeposition. In such cases, it is often desirable to utilize deionized water from which free ions have been removed, as by passage through an ion exchange resin.

Using the electrodeposition method of coating, the compositions as described above are applied by placing the aqueous bath containing the composition in contact with an electrically conductive anode and an electrically conductive cathode, and passing an electric current between the electrodes. The electrodes may be of any electrically conductive material, usually metal, such as iron, steel, aluminum, galvanized steel, phosphatized steel, zinc, copper and other metals. Other electrically conductive materials or non-conductive materials (such as glass, plastics, etc.) having a surface made conductive by application of a conductive coating or layer, can also be coated in accordance with the invention. Upon the passage of electric current between the anode and the cathode, while in contact with the bath containing the coating composition, an adherent film of the coating composition is deposited upon the anode.

Generally speaking, the conditions under which the electrodeposition process is carried out are those conventionally used in the electrodeposition methods employed heretofore. The applied voltage may be varied greatly, and can be very low, e.g., 20 volts, or very high, e.g., 600 volts or even higher.

It is desirable that the pH of the coating composition be as low as possible, consistent with product stability. The problem of increased pH encountered in baths employed in continuous electrodeposition may be overcome by the addition of unneutralized or only slightly neutralized product to the baths, which lowers the pH without affecting the advantageous properties of the composition.

The concentration of the coating composition in the aqueous bath used in electrodeposition is not critical and relatively high levels of the coating composition can be used. However, it is ordinarily desirable to use as low a concentration of coating composition as will give satisfactory results; aqueous baths containing as little as about 3 percent by weight of the coating composition can be employed, and it is preferred not to use more than about 20 percent by weight of the coating composition in the bath.

Electrodeposition produces an adherent film which is very high in solids content, often 80 percent to 95 percent or even higher, which provides the important advantage that the film will not readily run or wash. Additional baking or drying of the film is easily accomplished inasmuch as there is little or no solvent to be evaporated from the film. Ordinarily, the coated article is baked at temperatures of about 100 C. to 200° C. for about 10 minutes to 30 minutes.

The coating compositions of this invention are useful as coatings for many types of substrates. They are particularly advantageous as coatings for metals to protect the metals against corrosion. The compositions are especially adaptable for coatings in the fields of automotive finishing, automotive dip primers, and industrial coatings.

The invention will be described further in conjunction with several examples showing the method and practice of the invention. These examples, however, are not to be construed as limiting the invention to their details. All parts and percentages are by weight and are based upon non-volatile solvent contents unless otherwise indicated.

EXAMPLE 1

A dip primer for automotive bodies was formed by the following proces. Eleven hundred and ninety-seven parts of a water-soluble polycarboxylic acid resin comprising 88 parts of maleic anhydride and 720 parts of linseed oil were neutralized with 80 parts of diethyl amine.

One hundred and thirty point three parts of the above resin were mixed with 102.1 parts of deionized water for 15 minutes. A dispersing agent and antifoam were added while mixing for an additional 30 minutes. To this mixture was then added a ground pigment having the following composition:

| | Parts |
|---|---|
| Micro lead silicate | 100 |
| Lead silico-chromate | 19.9 |
| Barium sulfate | 100 |
| Carbon black | 32.5 |
| Magnesium silicate | 22.8 |

The resin and pigment mixture was agitated for 30 minutes. Ten parts of a 6 percent solution of manganese naphthenate in water was added and the mixture agitated for an additional 4 hours. At this point, 38.2 parts of zinc chromate were added and the mixture agitated for 30 minutes.

To this pigment was then added 85 parts of malenized linseed oil (88 parts of maleic anhydride and 720 parts of linseed oil) neutralized with 4.57 parts of diethanolamine. Added to this mixture were 20.1 parts of deionized water and 215.75 parts of a resin having the composition:

| | Parts |
|---|---|
| Linseed oil | 294 |
| Maleic anhydride | 40.2 |
| Deionized water | 196.8 |
| Butyl Cellosolve | 158 |
| Diethyl amine | 30.6 |
| Solvesso 100 | 80.2 |

The batch was mixed for 8 hours and allowed to stand for 8 hours. One hundred and sixty five point five parts of styrene butadiene latex were mixed in and agitated for 30 minutes and the solids content was adjusted to 55 percent with 12.1 parts of deionized water.

The above procedure was followed using the same materials with the exception that the lead silicate pigment and lead silico-chromate pigments were not included in the pigment composition and the two dip primers were compared.

The dip primer containing the lead pigments did not gel after the pigment composition was added and there was no seeding. The dip primer was completely homogeneous.

The dip primer containing the lead pigments also exhibited excellent corrosion resistance as indicated by its resistance to a salt spray test which is essentially equivalent to ASTM Test D–117–62 and involves exposing a 0.2 mil film of the composition to a fog of a salt solution comprising 5 parts by weight salt and 95 parts distilled water at a relative humidity of 100 percent and a temperature of 100° F. The coating with the lead pigments and zinc chromate was able to withstand 500 hours of salt spray exposure without any appreciable rusting of the metal base.

The primer without the lead pigments exhibited excess thickening and seeding and a homogeneous primer could not be obtained.

EXAMPLE 2

The process of Example 1 was followed using as the pigment composition:

| | Parts |
|---|---|
| Litharge | 11.9 |
| Barium sulfate | 100 |
| Carbon black | 32.5 |
| Magnesium silicate | 22.8 |

The resulting dip primer was a completely homogeneous, ungelled composition which had excellent corrosion resistance when used as a coating on a metal substrate.

EXAMPLE 3

A pigment concentrate for use in the electrodeposition process was prepared by mixing 510 parts of a water-soluble polycarboxylic acid resin (102 parts of maleic anhydride and 408 parts of linseed oil), 80 parts of diethyl amine, minor amounts of dispersing agent and antioxidant, and 1890 parts of deionized water.

Twelve hundred parts of basic silicate white lead (84 percent lead oxide) pigment and 1200 parts of basic zinc chromate pigment were ground in a pebble attritor to a Hegman Dispersion No. of 7 and added to the above resin simultaneously.

The electrocoat primer was prepared by charging a vessel with 294 parts of a water-soluble polycarboxylic acid resin (59 parts of maleic anhydride to 235 parts of linseed oil) and 28 parts of diethylene. The neutralized resin was mixed for 45 minutes. To this resin was added 3 parts of antioxidant and 406 parts of deionized water and the resin was mixed for an additional 10 minutes. One hundred and fifty seven parts of the above described pigment dispersion were added and the primer was thinned with sufficient amount of deionized water to fill a one gallon tank.

A steel substrate was electrocoated with this primer at 250 volts to yield a 0.96 mil primer having a throw power of 7 inches. The resulting film had an excellent appearance and was smooth.

The procedure used above was followed with the exception that the pigment dispersion contained only zinc chromate pigment. The pigment dispersion coagulated and could not be electrocoated.

EXAMPLE 4

The procedure of Example 3 was followed using a pigment dispersion containing 3240 parts of basic silicate white lead and 360 parts of calcium chromate pigment. The resultant electrocoating bath was stable and a steel plate was electrocoated at 300 volts with this primer to achieve a 0.80 mil primer with a throw power of 6 inches.

The procedure described above was followed using a pigment dispersion containing only 360 parts of calcium chromate pigment. The pigment dispersion coagulated and was unusable as an electrodeposition bath.

EXAMPLE 5

The procedure of Example 3 was followed using a pigment dispersion containing 1200 parts of strontium chromate pigment in place of the 1200 parts of zinc chromate pigment. The coating composition obtained was set aside on a shelf for 6 months at room temperature to test its stability to gelling and seeding. At the end of 6 months, the composition was ungelled and homogeneous.

The procedure described above was followed with the exception that the pigment dispersion did not contain the basic silicate white lead pigment. The coating composition gelled and was unusable.

EXAMPLE 6

The pigment dispersion of Example 3 was added to 294 parts of a water-soluble polycarboxylic acid resin (a malenized resin having the repeating structure:

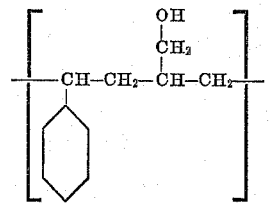

and having a molecular weight of 1150 and an equivalent weight of 222 and tested for stability to gelation. The primer was kept on a shelf for 9 months and exhibited no signs of gelling.

The primer was used to electrocoat a steel substrate at 250 volts. The coating was subjected to the salt spray test for 1800 hours and showed no sign of corrosion.

According to the provisions of the patent statutes, there is described above the invention and what are now considered to be its best embodiments. However, within the scope of the appended claims, it is to be understood that the invention can be practiced otherwise than as specifically described.

What is claimed is:

1. The method of coating a metal substrate which comprises passing electric current between an electrically conductive cathode and said substrate serving as an anode in contact with an aqueous bath comprising an electrodepositable composition comprising a stable homogenous ungelled aqueous dispersion of:
    (A) water-soluble vehicle comprising a polyboxylic acid resin at least partially neutralized with a water-soluble alkaline material, and
    (B) a pigment composition comprising
        ment, and
        (1) a corrosion resistant metal chromate pigment, and
        (2) a lead pigment compound wherein the lead pigment is added to the composition to completely react the free acid ions therein prior to the addition of the metal chromate pigment.
2. The method of claim 1 wherein the water-soluble alkaline material is an amine.
3. The method of claim 1 wherein the metal chromate pigment is zinc chromate.
4. The method of claim 1 wherein the lead pigment is litharge.
5. The method of claim 4 wherein the composition contains from about 1 to about 35 percent litharge.

References Cited

UNITED STATES PATENTS 3,404,079 10/1968 Boardman _____ 204—181
3,449,228 6/1969 Yurcheshen et al. ____ 204—181

HOWARD S. WILLIAMS, Primary Examiner

U.S. Cl. X.R.

117—132 A, 132 R

UNITED STATES PATENT OFFICE
CERTIFICATE OF CORRECTION

Patent No. 3,684,676          Dated  August 15, 1972

Inventor(s)    Morris Levine et al

It is certified that error appears in the above-identified patent and that said Letters Patent are hereby corrected as shown below:

Column 10, line 42, "polyboxylic" should be --polycarboxylic--; line 45, delete "ment, and".

Signed and sealed this 8th day of May 1973.

(SEAL)
Attest:

EDWARD M. FLETCHER, JR.          ROBERT GOTTSCHALK
Attesting Officer                Commissioner of Patents